US006799089B2

(12) United States Patent
Toulhoat

(10) Patent No.: US 6,799,089 B2
(45) Date of Patent: Sep. 28, 2004

(54) DESIGN OF NEW MATERIALS WHOSE USE PRODUCES A CHEMICAL BOND WITH A DESCRIPTOR OF SAID BOND

(75) Inventor: Hervé Toulhoat, Herblay (FR)

(73) Assignee: Institut Francais du Petrole, Rueil Mal Maison (FR)

( * ) Notice: Subject to any disclaimer, the term of this patent is extended or adjusted under 35 U.S.C. 154(b) by 118 days.

(21) Appl. No.: 09/875,370

(22) Filed: Jun. 8, 2001

(65) Prior Publication Data

US 2002/0019684 A1 Feb. 14, 2002

Related U.S. Application Data

(60) Provisional application No. 60/271,693, filed on Feb. 28, 2001.

(30) Foreign Application Priority Data

Jun. 9, 2000 (FR) ............................................. 00 07473

(51) Int. Cl.[7] ......................... G05B 21/00; G06F 19/00; G01N 31/10
(52) U.S. Cl. ......................... 700/266; 436/37; 436/177; 436/178; 700/268; 700/273
(58) Field of Search .......................... 436/37, 177, 178, 436/183; 700/266, 268, 273; 702/30

(56) References Cited

U.S. PATENT DOCUMENTS 6,038,514 A 3/2000 Nozaki ........................ 702/27
6,149,799 A * 11/2000 Raybaud et al. .............. 208/49

FOREIGN PATENT DOCUMENTS

FR 2 758 278 7/1998

OTHER PUBLICATIONS

Sokalski, W et al, Journal of Molecular Catalysis 1985, 30, 395–410.*
Topsoe, H. et al, Studies in Surface Science and Catalysis 1999, 121(Science and Technology in Catalysis 1998), 13–22.*
Byskov, L. S. et al, Journal of Catalysis 1999, 187, 109–122.*
Likholobov, V. A. et al, Homogeneous Heterog. Catal., Proc. Int. Symp. Relat. Homogeneous Heterog. Catal., 5th 1986, 229–244, Editors: Ermakov, Yu. I.; Likholobov, V. A. Publisher: VNU Sci. Press, Utrecht, Neth.*
Marecot, P. et al, Applied Catalysis, A 1993, 101, 143–149.*
Kubicka, H. Journal of Catalysis 1968, 12, 223–237.*
Volter, J. et al, Journal of Catalysis 1968, 12, 307–313.*
Vijh, A. K. Journal de Chimie Physique et de PhysicoChimie Biologique 1973, 70, 635–638.*
Sapienza, R. S. et al, Report , BNL–24427, 1978, 11 pages.*
Kasztelan, S. et al, Applied Catalysis 1984, 13, 127–159.*
Kasztelan, S. et al, Bulletin des Societes Chimiques Belges 1984, 93, 807–811.*

Schoenmaker–Stolk, M. C. et al, Applied Catalysis 1987, 30, 339–352.*
Greene, H. L. et al, Manage. Hazard. Toxic Wastes Process Ind. 1987, 513–541.*
Koussathana, M. et al, Applied Catalysis 1991, 77, 283–301.*
Norksov, J. K. et al, Catalysis Letters 1992, 13, 1–8.*
Treacy, M. M. J. et al, Proc. Int. Zeolite Conf., 1993, 9th, 381–388.*
Slater, J. M. et al, Analyst 1994, 119, 191–195.*
Langenaeker, W. et al, Journal of Physical Chemistry 1994, 98, 3010–3014.*
Furthmuller, J. et al, Physical Review B 1994, 50, 15606–15622.*
Ogut, S. et al, Turkish Journal of Physics 1995, 19, 74–87.*
Hafner, J. et al, Properties of Complex Inorganic Solids 1997, 69–82.*
Toulhoat, H. et al, Preprints—American Chemical Society, Division of Petroleum Chemistry 1997, 42, 114–117.*
Nikiforov, L. G. et al, High Temperature 1997, 35, 973–974.*
Maged, A. F. et al, Journal of Engineering and Applied Science 1998, 45, 441–452.*
Makino, Y. ISIJ International 1998, 38, 925–934.*
Moll, N. et al, Materials Science and Engineering 1999, B67, 17–22.*
Yajima, K. et al, Applied Catalysis A: General 2000, 194–195, 183–191.*
XP–000986812—"Transition metals to sulfur binding energies relationship to catalytic activities in HDS: back to Sabatier wth first principle calculations", Herve Toulhoat et al., H. Toulhoat et al./Catalysis Today 50 (1999) 629–636.
XP–000986916—"Ab initio density functional studies of transition–metal sulphides: I. Crystal structure and cohesive properties", P. Raybaud et al., J. Phys.: Condens, Matter 9 (1997) 11106.
XP–002161357—"The Isotopic Exchange Reaction of Oxygen on Metal Oxides", C. Doornkamp et al., Journal of Catalysis 182, 390–399 (1999).
English Abstract of XP–002161359.
English Abstract of XP–002161360.

* cited by examiner

*Primary Examiner*—Arlen Soderquist
(74) *Attorney, Agent, or Firm*—Millen White Zelano & Branigan, P.C.

(57) ABSTRACT

For estimating a property of use, for example the activity of a catalyst or the ability to hold a ratio-element in a solid mineral matrix, or a material $M_{AB}$ whose active element is AB, there are used a descriptor $D_{AB}$ of the chemical bond between A and B, which has the dimension of an energy, and index $R_{AB}$ that measures the property of use of said material. The invention also relates to a process for determining the chemical affinity of an element or a set of elements B for a matrix A with a descripor $D_{AB}$. The process according to the invention advantageously can be used for the design of new materials whose use produces the formation or the modification of at least one chemical bond or makes it necessary to prevent the formation of said bond.

12 Claims, 3 Drawing Sheets

Figure 1:
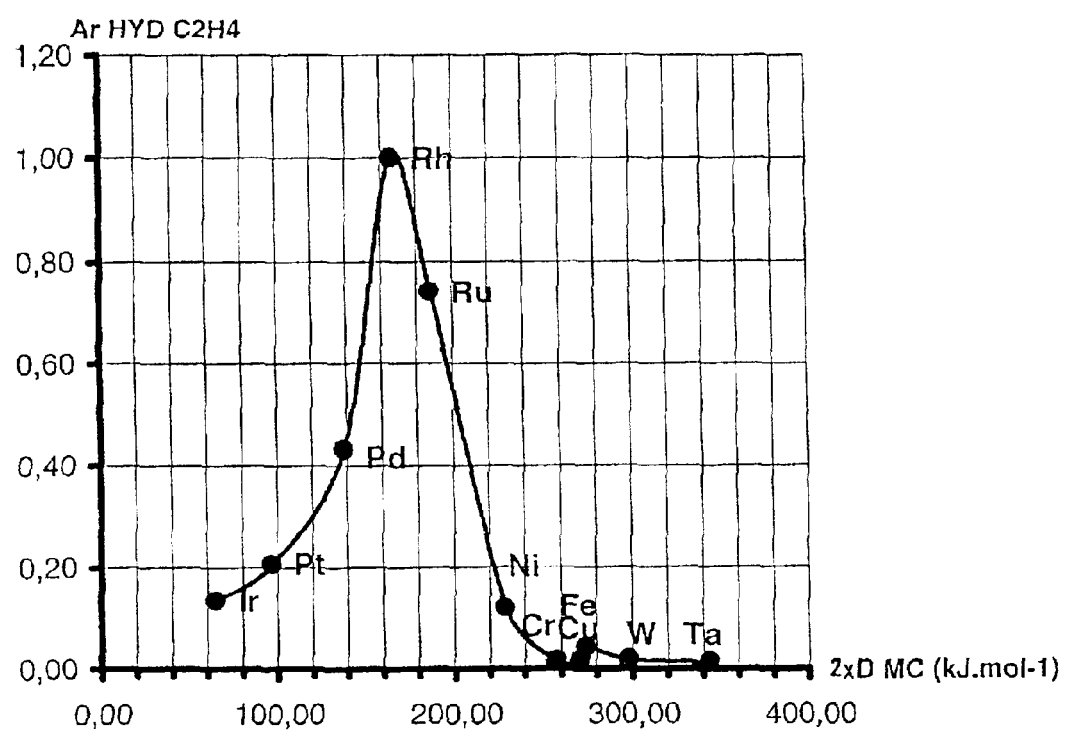

DESIGN OF NEW MATERIALS WHOSE USE PRODUCES A CHEMICAL BOND WITH A DESCRIPTOR OF SAID BOND

The benefit of provisional application 60/271,693 filed Feb. 28, 2001 is claimed under 35 U.S.C. 119(e).

This invention relates to a process for estimating a property of use, for example the activity of a catalyst or the ability to hold a radio-element in a solid mineral matrix, of a material $M_{AB}$ whose active element is AB. The invention also relates to a process for determining the chemical affinity of an element or set of elements B for a matrix A, for example the affinity of a material for oxygen or sulfur-containing compounds or halogenated compounds. This more or less significant affinity makes it possible, for example, to identify the resistance of this material to corrosion by sulfur-containing compounds or halogenated compounds or by oxidation. Many other applications of these processes can be considered, some of which are explained below. More generally, the processes according to the invention therefore make it possible to select or to design new materials whose use produces the formation or the modification of at least one chemical bond that is characterized by a descriptor $D_{AB}$ or makes it necessary to prevent the formation of said bond.

PRIOR ART

In the present prior art, the selection or the design of materials for a determined application is considered only on an experimental basis according to the trial-and-error method. This practice is obviously long and expensive, and any process that allows a significant reduction of this search phase would offer a technical and economic advantage.

Numerous properties of use of the materials are to a large extent directly determined by the forces of chemical cohesion that are inherent to their composition: this is the case, for example, of mechanical properties (modulus of elasticity, resistance to rupture, hardness . . . ) of metals and their alloys, ceramics, construction materials, or else the case of solubilities of host elements, used for, for example, the capture of radioactive elements in mineral structures for storage purposes. These chemical cohesion forces will also determine all of the surface properties of the materials, of which one skilled in the art knows the technological importance: friction coefficient, resistance to wear, corrosion behavior, resistance to oxidation, adhesiveness, wettability, catalytic activity . . . .

The chemical cohesion forces also govern the local atomic structure of a material and thereby its electronic structure and all the physical properties (electronic, optical, magnetic . . . ) that are derived therefrom. The search for new high-temperature superconductive phases of electric current or else the search for new solid electrolytes with improved ionic conductivity for the production of more efficient fuel cells thus amount to searching for chemical compounds that have a special local organization (see, for example, J. B. Goodenough, Nature, Vol. 404, 20/04/2000, pp. 821–822, and cited references).

The practician in the search for new materials for a given application relies as much as possible today on the knowledge and the methods developed by the scientific discipline that is the chemistry of the solid: the latter quantifies the relative stabilities of the structures under given temperature and pressure conditions on the basis of the standard concept of formation enthalpy.

The standard formation enthalpies of a very large number of compounds have been measured experimentally and tabulated; they make it possible, for example, to construct so-called useful "phase" diagrams for the purpose of locating the areas of experimental conditions inside of which the structures of interest remain stable. These data and diagrams therefore have a limited value for the invention of new stable phases in an area of use that is specified at the very most so that one skilled in the art can therefore extrapolate by chemical analogy and intuition starting from known structure and composition phases.

For the purpose of guiding his action logically, the chemist that practices the synthesis of organic or inorganic compounds worked out early on the concept of chemical affinity and then, when the atomic structure of the material had been well established, the concept of interatomic force was developed. Modern theoretical chemistry has as its central object the elaboration of a quantitative and predictive theory of the chemical bond within atomic, molecular or crystalline structures.

Quantum physics provided the basis of a mathematical theory whose extreme precision is verified the better and in a broader range in proportion as the increase of power of electronic computers allows the digital resolution of constituent equations for increasingly more complex chemical compositions. These so-called "ab initio" calculation techniques, since they were unencumbered by prior knowledge of empirical data, were developed in less than two decades to the extent that it became conceivable to use them to predict the stability, the geometry and the physical and chemical properties of a chemical structure of given composition, prior to any laboratory attempt at synthesis.

This "design of computer-assisted material" is a very active methodological area of research but of which a very limited number of practical successes is known. These successes are confined to special cases, for example the development of a hydrocarbon reforming catalyst with a metallic nickel-based vapor and with increased stability by selective deposition of gold atoms on the surface (F. Besenbacher et al. Science, Vol. 279, 1913–1915, Mar. 20, 1998) or else the demonstration of a cathode composition that significantly improves the voltage and reduces the weight and the cost of a lithium battery (G. Ceder et al. Nature, Vol. 392, 694–696, Apr. 16, 1998). These recent cases of success rather exemplify an approach of verification by the calculation of a design of intuitive origin, confirmed a posteriori by experimental measurement.

The economic advantage of such paths is not clearly demonstrated currently, but anyone skilled in the art will impart to them a fundamental superiority in exploratory experimentation by trial and error, whose implementation will depend on the speed and the cost of the calculations to be used.

In this connection, the very fast growth over time of the calculation power at consistent cost, because of the advances in the technologies for integrating electronic circuits, suggests decisive breakthroughs in the near future. The process according to the invention unexpectedly anticipates in this direction, as a process for fast ab initio calculation of quantitative descriptors of the chemical bond in crystalline solids, that makes it possible to classify the latter by order of efficiency for a large number of applications of primary technological importance.

A strategy for exploratory searching for new materials that it is possible to consider as diametrically opposed to the "design of computer-aided materials" defined above consists of the "combinatorial chemistry" that appeared several years ago (see, for example, U.S. Pat. Nos. 5,959,297 and 5,985, 356) and that makes sense only when combined with so-called "high-flow experimentation" techniques. In this case, the idea is to explore systematically by experiment a predefined space of compositions and synthesis conditions. The materials that result from these systematic combinations are prepared in very small quantities, just enough for tests that make possible a sorting according to the desired property or properties. The combinations that pass the tests make it possible to redefine a more restricted exploration space within which can be reiterated the combinatorial synthesis procedure and test for the purpose of refining the identification of combinations consistent with the initial target. The combination or combinations that are discovered are then synthesized in larger quantities to measure their properties of use with precision.

The "combinatorial chemistry" approach was recently the subject of considerable financial investments having led to significant technological developments. In this context, the computer technologies facilitate the management and the tracing of the properties of a large number of samples that are synthesized and tested very quickly. They also make it possible to guide the generally robotized process of synthesis and testing at high speed. The targets of the "combinatorial chemistry" to date have been, for example, new molecular medications, new photophore materials (U.S. Pat. No. 6,013,199), new polymerization catalysts (U.S. Pat. Nos. 6,034,240, 6,043,363), new materials with giant magnetoresistance (U.S. Pat. No. 5,776,359) or else new heterogeneous catalysts (S. M. Senkan in Nature, Vol. 394, pp. 350–353, Jul. 23, 1998).

The practicians of "combinatorial chemistry" have fairly quickly recognized that the blind exploration of a field of combinations generally has an extremely low success rate, which runs the risk of not being balanced enough by the very large number of experiments. Methods for improvement that amount to guiding the exploration by elements of a priori knowledge have therefore been proposed. A sorting cycle can also be considered as an input of knowledge able to better guide the next sorting cycle. For this purpose, Baerns et al. thus demonstrated, for example, the advantage of a so-called artificial evolution procedure (Baerns et al., Conférence sur les approches combinatoires pour la découverte de nouveaux matériaux ("Combinatorial Approaches for New Materials Discovery"), organized by "The Knowledge Foundation" (Fondation du Savoir), San Diego, Calif., USA, Jan. 23–25, 2000).

Another method consists in developing structure-property quantitative relationships (RQSP) by correlating a performance index according to the targeted property with a set of digital parameters that identify each chemical compound and are called descriptors. The descriptors are generally obtained from theoretical calculation: molecular weight, molecular volume, factors of geometric shape, moments of mean charge distribution, topological indices, see, for example, J. M. Newsam, in "Catalyse combinatoire et haut débit de conception et d'évaluation de catalyseurs" (Combinatorial Catalysis and High Throughput Catalyst Design and Testing), publication series NATO ASI, Editor E. G. Derouane, Editeur Kluwer Academic, Dordrecht, 1999. The methods of modern linear or non-linear regression often make it possible to establish good correlations between performance index and a multivaried mathematical function of a limited set of descriptors. Such correlations make it possible to orient the combinatorial search for the chemical structures whose theoretical descriptors maximize the function that models the performance index. The method of the theoretical descriptors, however, is currently applied almost exclusively to molecular compounds, and a descriptor example is not known for crystalline materials.

The author of this invention already published works that describe a primitive descriptor design of the metal-sulfur bond energy in transition metal sulfides and its use for characterizing the catalytic activity of such sulfides (see H. Toulhoat et al. in "Catalysis Today" (La Catalyse Aujourd'hui), V50, p. 629–636, 1999 and Patent FR-2,758, 278). This primitive descriptor, however, is defined there as the ratio of the cohesion energy of the solid per unit cell to the number of bonds of the type considered identifiable by unit cells. This definition is different from the definition that is given for the descriptor according to this invention and is not derived from it.

SUMMARY OF THE INVENTION

This invention describes how a family of theoretical descriptors of the chemical bond between atomic pairs in any crystalline solid can be used to find new solids with a determined use. These new descriptors unexpectedly have a predictive capacity for multiple properties of technological use of crystalline solids, such as, for example, the catalytic activity or else the capability for storage of radio-elements.

This invention pertains to any form of exploratory search for new materials whose desired properties can be correlated with the descriptors whose calculating method is specified. It has a very special advantage when new techniques for high-flow-rate synthesis and sorting are implemented, in particular for the purpose of finding active materials in the form of crystalline or partially crystalline solids.

The invention relates to a process for estimating a given property of use of a material $M_{AB}$ whose active element is AB, starting from a descriptor. This descriptor is a calculated quantity, bound to each material, and can be correlated to the property of use of said material. This property of use is estimated with an index $R_{AB}$ that can be determined with the process according to the invention. Thus, when the use of the material is the catalysis, its property of use (catalytic activity) can be quantified thanks to the measurement of the speed of the catalyzed reaction or the conversion. When the property of use that is studied is the corrosion resistance of a material, this property can be quantified with, for example, the speed of oxidation of said material. Said descriptor has the dimension of an energy and is considered as representative of the chemical bond energy between an element or set of elements B and the element or set of elements A, in a material of general formula AB.

The process according to the invention is therefore a process for estimating a property of use of a material $M_{AB}$ whose active element is AB. It is thus possible, thanks to the process according to the invention, to determine an index $R_{AB}$ that constitutes an estimation of the property of use of material $M_{AB}$.

Said process comprises the following stages:

a) Determination of the value of descriptors $D_{XY}$ for a set of materials $M_{XY}$ whose active element is XY and whose index $R_{XY}$ that measures the property of use of said material is known, b) diagram or mathematical expression of correlation $R_{XY}=f(D_{XY})$, c) calculation of descriptor $D_{AB}$ for material $M_{AB}$, d) determination of index $R_{AB}$ that constitutes an estimation of the property of use for material $M_{AB}$ by relating value $D_{AB}$ to correlation $R_{XY}=f(D_{XY})$, or by using the mathematical expression of said correlation.

The invention also makes it possible to determine the chemical affinity of an element or set of elements B for another element or a matrix A that consists of a set of elements, for example, the affinity of carbon for a metal for forming a carbide, or the affinity of oxygen with regard to a metal for forming an oxide.

DESCRIPTION OF THE INVENTION

This invention describes a process for design and/or selection of materials for a predefined use. The process according to the invention actually makes it possible to estimate the property of use, therefore the level of performance of a material in this use, for example for applications of heterogeneous catalysis. It also makes it possible to determine the chemical affinity of an entity A that consists of at least one chemical element for a matrix B that consists of at least one chemical element.

The process according to the invention is based on the calculation of quantities that measure the affinity of the material for a given chemical element and thereby are predictive of a given property of use. This use can be, for example, the heterogeneous catalysis according to the Sabatier principle that is well known to one skilled in the art, the storage of radioactive elements by insertion into a mineral matrix, the promotion of the adhesion or the wetting, cohesion and associated mechanical properties, corrosion resistance, whereby this list is not limiting.

Any usage that produces the chemical affinity of an element or a set of elements that are present for another element or set of elements generally can be studied with the process according to the invention so as to select new materials for this use or to determine the degree of chemical affinity of an element or set of elements.

The process according to the invention uses an algorithm or calculation process, quantities of type $D_{XY}$ (or $D_{AB}$) that have the dimension of an energy. Each of these quantities that are called descriptor of the chemical bond energy in a material of general formula XY (or AB) between an element Y (B) and its complement X (A), X, Y, A or B can consist of any number of atoms and have variable stoichiometries. Thus, for example, it is possible to apply the process according to the invention in the case of the measurement of the affinity between a carbon atom C (element B) and a set that comprises 3 metallic atoms $M_3$ (set of elements called A) to form an $M_3C$ (AB) carbide. It is also possible to apply the process according to the invention in the case of the measurement of the affinity of a set that consists of three oxygen atoms $O_3$ (set of elements called B) for a set that consists of two metallic atoms $M_2$ (called set A), for forming oxide $M_2O_3$ (AB). Other illustrations will be given below, in particular in the examples.

When the crystalline characteristics of the XY material are available in a crystallographic data base, descriptors $D_{XY}$ and/or $D_{AB}$ can be calculated with process P1 that comprises the following stages:

a1) Identification of the crystalline characteristics of material XY (or AB) in an experimental crystallographic data base, a2) calculation of the total energy per unit mesh of the Bravais lattice of XY (or AB), a3) construction of sub-mesh X (or A) that is obtained by eliminating the B-type atoms of optimal mesh XY (or AB), a4) calculation of total energy $E_X$ (or $E_A$) per unit mesh of the Bravais lattice of X (or A), a5) construction of sub-mesh Y (or B) that is obtained by eliminating all of the atoms that belong to complement X (or A) in optimal mesh XY (or AB), a6) calculation of total energy $E_Y$ (or $E_B$) per unit mesh Y (or B) of the Bravais lattice of B, a7) determination of number n of atoms of X (or A) that are present in the first sphere of coordination of a Y (or B) atom in optimal mesh XY (or AB), a8) determination of number b of Y (or B) atoms per optimal mesh XY (or AB), a9) calculation of descriptor $D_{XY}$ (or $D_{AB}$) by applying the following formula: $D_{XY}=[E_{XY}-(E_X+E_Y)]/nb$ (or $D_{AB}=[E_{AB}-(E_A+E_B)]/nb$).

Descriptors $D_{XY}$ and/or $D_{AB}$ can also be calculated with process P2, for example but not exclusively when the crystalline characteristics of material XY are not available in a crystallographic data base. Process P2 comprises the following stages:

a1) Identification of the crystalline characteristics of material XY (or AB) by analogy with existing structures or in an experimental crystallographic data base, a2) calculation of the total energy per unit mesh of the Bravais lattice of XY (or AB), a3) iterative search for the values of the mesh parameters of the structure that minimize the total energy according to the adopted calculation method and that define optimal mesh XY (or AB) of total energy $E_{XY}$ (or $E_{AB}$), a4) construction of sub-mesh X (or A) that is obtained by eliminating the B-type atoms of optimal mesh XY (or AB), a5) calculation of total energy $E_X$ (or $E_A$) per unit mesh of the Bravais lattice of A, a6) construction of sub-mesh Y (or B) that is obtained by eliminating all of the atoms that belong to complement X (or A) in optimal mesh XY (or AB), a7) calculation of total energy $E_Y$ (or $E_B$) per unit mesh Y (or B) of the Bravais lattice of Y (or B), a8) determination of number n of X (or A) atoms that are present in the first sphere of coordination of a Y (or B) atom in optimal mesh XY (or AB), a9) determination of number b of Y (or B) atoms per optimal mesh XY (or AB), a10) calculation of descriptor $D_{XY}$ (or $D_{AB}$) by applying the following formula: $D_{XY}=[E_{XY}=(E_X+E_Y)]/nb$ (or $D_{AB}=[E_{AB}=(E_A+E_B)]/nb$.

For the implementation of the process for estimating the property of use according to the invention that comprises stages a) to d), either only process P1, or only process P2 or else at one time process P1 and at another time process P2 will therefore be used for the calculation of the various descriptors.

The method for identifying crystalline characteristics is well known to one skilled in the art: it consists in determining the elementary mesh of the Bravais lattice of the crystal by the coordinates of its three unit vectors a, b and c, in the three-dimensional space of the Euclidean geometry, then the set of atoms that constitute the asymmetrical mesh and their coordinates in the reference that consists of the three vectors a, b, and c, and finally the set of symmetry operations to be applied to the positions of the atoms of the asymmetrical mesh to reconstruct all of the atomic positions of the unit mesh. The infinite perfect crystal structure is entirely determined by the translation operations of the unit mesh into the space along the three vectors a, b, and c. All of the symmetry operations except the three translations form a group within the meaning of the mathematical theory of the groups, said space group. The number of these groups is finite, and there is a well-catalogued nomenclature for it.

Experimental techniques that make it possible to determine the crystalline characteristics of a crystalline compound (also called crystalline material) rely on diffraction phenomena of electromagnetic waves, such as x-rays or else particles such as neutrons. The work "Structure et analyse chimique des matériaux (Structure and Chemical Analysis of Materials)" of Professor J. P. Eberhart, edited by John Wiley and Sons, in Chichester in 1991, makes reference to the determination of the crystalline characteristics of solids to describe the theoretical and technical principles. The crystalline characteristics of a very large number of materials were determined experimentally and are listed in publicly accessible data bases, such as, for example, the "Base de donnée des Structures Cristallines Minérales (Inorganic Crystal Structure Database or ICSD)" that is produced by the Institut de Chimie Minérale Gmelin et le Centre d'Informations Factuelles (Gmelin-Institut fuer Anorganische Chemie et Fachinformationszentrum) of Karlsruhe in Germany, or else the base "Crystmet" that is produced by the group of Professor John R. Rodgers in Ottawa, Canada. These two data bases are distributed in electronic form in particular by the companies SciCo Inc. 5031 Palermo Drive, Oceanside, Calif. 92057, USA, and Materials Design S.A.R.L. 44 avenue F. A. Bartholdi, 72000, Le Mans, France.

The determination of structures by analogy with existing structures consists of simply the design of a hypothetical structure by substitution of atoms of a known structure on the basis of chemical similarities that are known to one skilled in the art. For a crystalline material of general formula XY (or AB), number b of Y- (or B-) type atoms per mesh is obviously derived from the knowledge of all of the atomic positions of the unit mesh according to the method that is explained above.

The method for calculating the total energy is preferably a method for resolution of the Schrödinger equation that describes the movement of the electrons of material XY (or AB) in the periodic Coulomb field that is determined by the lattice of atomic cores that are located in a mesh, and more preferably a method for resolution that is derived from the functional theory of density (see, for example, the article by E. Wimmer in "Nouvelles Tendances dans la Chimie des Matériaux (New Trends in Materials Chemistry)," C. R. A. Catlow and A. K. Cheetham, Editors, published by Kluwer Scientific, Dordrecht, pp. 195–238, 1997).

The method for determining number n of X (or A) atoms that are present in the first coordination sphere of a Y (or B) atom in the optimal mesh of XY (or AB) is defined as follows: it requires the data of all of the atomic positions of the atoms that constitute the unit mesh of the crystalline material of XY (or AB), according to the method that is described above. A Y (or B) atom is selected, and the position of its center of mass is selected as the center of a sphere, so-called "first coordination sphere," whose radius is set at a value that corresponds to the lengths of usual chemical bonds, or about 0.05 to 0.4 nanometers, preferably 0.1 to 0.3 nanometers, to include in this sphere the first adjacent atoms of Y (or B) that are located at distances that are equal or comparable to Y (or B).

The invention relates in particular to a process $E_P$ for estimating a property of use of a material $M_{AB}$ whose active element is AB. It is actually possible, thanks to the process according to the invention, to determine an index $R_{AB}$ that constitutes an estimate of the property of use of material $M_{AB}$.

Said process $E_P$ comprises the following stages:
a) Determination of the value of descriptors $D_{XY}$ for a set of materials $M_{XY}$ whose active element is XY and whose index $R_{XY}$ that measures the property of use of said material is known,
b) diagram or mathematical expression of the correlation $R_{XY}=f(D_{XY})$,
c) calculation of descriptor $D_{AB}$ for material $M_{AB}$,
d) determination of index $R_{AB}$ that constitutes an estimate of the property of use for material $M_{AB}$ by recording value $D_{AB}$ in correlation $R_{XY}=f(D_{XY})$ or by using the mathematical expression of said correlation.

Surprisingly enough, descriptor $D_{AB}$ makes it possible to estimate the value of the property of use for material $M_{AB}$ whose active element is a crystalline or semi-crystalline chemical material AB to which said descriptor relates.

Experimental values of indices $R_{XY}$ that measure properties of use, such as, for example, inherent reaction speeds, which make it possible to compare in a valid manner the activities of pure transition metals, are available in the literature for numerous reactions of industrial advantage such as, for example, the hydrogenation of ethylene or other olefins, the hydrogenation of benzene, the hydrogenation of carbon monoxide, the dealkylation with the vapor of toluene, alkylation reactions of paraffins or atomatic compounds, hydrotreatment, isomerizing hydrocracking, selective hydrogenation of diolefins and acetylene compounds or reforming compounds, whereby this list is not limiting.

Numerous attempts have been made to correlate these sets of speed data with various descriptive parameters of metals or with various quantities that measure the physico-chemical properties of these metals, without to date any having been able to provide a guide that convinces one skilled in the art to identify a new catalytic composition that would have a higher reaction speed than those already observed.

Surprisingly enough, it was noted that by shifting the activity values in different chemical reactions ($R_{XY}$ index) based on descriptors $D_{XY}$ according to the invention, volcano curves are obtained whose activity maximum $R_{MAX}$ is located at different spots according to the chemical reaction. To each chemical reaction, there corresponds a maximum master curve of characteristic shape, and the abscissa of this maximum is itself characteristic. It is now possible to calculate descriptor $D_{AB}$ that corresponds to a new catalytic material $M_{AB}$ and relative to the master curve or calculation by using the mathematical expression of correlation $R_{XY}=f(D_{XY})$ to provide reaction speed $R_{AB}$ of this catalytic material in the desired chemical reaction.

Thus, it was found, for example, that for numerous reactions for transformation of molecules that contain carbon, the property of use of index $R_{XY}$, which is then the catalytic activity level of the metals and transition metal alloys (for example, measured by the speed of the chemical reaction), is correlated with descriptor $D_{MC}$ relative to the carbides of metals M that are considered. For example, when MαC is a transition metal carbide, $D_{MC}$ describes the energy of the metal-carbon bond, and it was discovered that correlations exist between descriptor $D_{MC}$ and the inherent catalytic activity of metal M that is measured experimentally for a large number of reactions of practical interest. It is therefore possible to discover a priori the activity of another metal or a compound of metals by calculating the corresponding descriptor.

These correlations seem to conform to the Sabatier principle, well known to one skilled in the art according to which, when the speed of a given chemical reaction V is considered, all other things being equal, in the presence of a series of materials whose surface can catalyse this reaction, this speed is maximum for an interaction force F between reagent and surface that is neither too strong nor too weak. If one skilled in the art is able to join the representative points of his experiments in a plane of coordinates V and F, he generally obtains a very pronounced maximum curve, referred to according to the established term "volcano curve" (see, for example, the article by Professor M. Boudart: "Principes de Catalyse Hétérogène (Principles of Heterogeneous Catalysts)," pp. 1 to 13, in the Manuel de Catalyse Hétérogène (Handbook of Heterogeneous Catalysis), Editors G. Lrtl et al., Editors Wiley-VCH, Weinheim, 1997).

In another area of application, $D_{AB}$ proves an excellent descriptor of the effect of poisoning of a catalyst of composition A by an element B.

Descriptors $D_{AB}$ have numerous applications in the design of materials, very particularly when exploratory search that couples high-flow experimentation and combinatorial exploration of a chemical composition space is considered: the calculation a priori of descriptors $D_{AB}$ correlated alone or combined with the desired properties of use makes it possible to eliminate a large number of compositions without advantage and to be very efficient by reserving experimental verification for only the compositions that are predicted to be of advantage by the descriptor or descriptors of the process according to the invention.

The various stages of calculation of said descriptor can be carried out by using any method that is known to one skilled in the art, for example, with an electronic calculator or a computer. Computer means that allow all or part of the stages of the process according to the invention to be automated, as well as various calculations, will preferably be used.

Experimental values of inherent reaction speeds that make it possible to compare in a valid manner the activities of pure transition metals are available in literature for numerous reactions of industrial advantage, such as, for example, the hydrogenation of ethylene, the hydrogenation of benzene, the hydrogenation of carbon monoxide, the dealkylation with the vapor of toluene, and others, whereby this list is not limiting, and whereby any catalytic reaction can be considered in the process according to the invention.

Another very useful application of the invention consists in the search for catalysts that are resistant to poisoning by residual impurities of reagents, for example the sulfur-containing or nitrogen-containing heteroatomic compounds that it is difficult to separate completely from the hydrocarbons that are obtained by distillation of crude oil. One skilled in the art knows the strong toxicity of the sulfur or nitrogen atoms (S or N) for the transition metal-based catalysts that are used, for example, in hydrogenation, isomerization or hydrogenolysis in the refining operations. Numerous works are dedicated to the search for alloys or compounds that maintain sufficient activity in the presence of such poisons. Descriptors $D_{mp}$ where P is the position element and M is the catalytic composition make it possible to carry out a proportional classification of the toxicity of P for M. One skilled in the art will therefore find a considerable advantage in preparing and testing the only compositions for which the calculation a priori with the process according to the invention indicates a lower toxicity of poison P than for the known compositions.

These results that are illustrated by the examples below demonstrate the general scope of the invention in the field of searching for new catalysts, but the invention is not limited to this single field.

The artificial radioactive elements with a long life span that are produced by certain nuclear reactions constitute biological dangers and absolutely must be contained. Among the very long-term holding methods preferred by one skilled in the art, the putting into solid solution of these elements in a mineral of considerable chemical inertia is the object of active experimental and theoretical research (see, for example, "L'élimination des armes au plutonium (Disposal of Weapons Plutonium)," Editors E. R. Merz et al., Publications Kluwer Academic, Dordrecht, 1996): the solubility of a radio-element $R_e$ in a mineral Z is obviously directly tied to the bond energy between $R_e$ and the atoms that constitute its closest neighbors in structure Z: descriptor $D_{ZRe}$ that is calculated with the process according to the invention makes it possible to gain access to an estimate of this solubility.

The theoretical nature of the calculation makes possible the evaluation of the solubility of $R_e$ in an existing mineral with a crystallographic structure that is known in the composition from which an isotope of $R_e$ would enter. It also makes it possible to evaluate this solubility when $R_e$ enters into a position of insertion or substitution in a mineral whose major elements are different from $R_e$. The process according to the invention is therefore a very efficient tool for the purpose of faster determination of the crystalline structures or that have at least a local atomic order, which can ensure an efficient sequestration of the radio-elements that are dangerous for our biosphere.

The invention also relates to a process $A_F$ for determining the chemical affinity of an element or set of elements B for a matrix A that consists of at least one element. Said process comprises the following stages:

a) Identification of the crystalline characteristics of material AB, calculation of the total energy per unit mesh of AB or iterative search for the values of the parameters of optimal mesh AB of total energy $E_{AB}$, b) construction of sub-mesh A by eliminating the B-type atoms of the optimal mesh, c) calculation of total energy $E_A$ per unit mesh of A, d) construction of sub-mesh B eliminating all of the atoms that belong to complement A in the optimal mesh, e) calculation of total energy $E_B$ per unit mesh of B, f) determination of number n of A atoms that are present in the first sphere of coordination of an atom B in the optimal mesh, g) determination of number b of B atoms in the optimal mesh, h) calculation of descriptor $D_{AB}$ according to formula $D_{AB}=[E_{AB}-(E_A+E_B)]/nb$.

Process $A_F$ can, preferably but not exclusively, be used for the applications cited below. In cases where enough experimental data (crystallographic data for materials XY and indices $R_{XY}$ that measure the property of use) exist in the literature or have been measured previously, however, process $E_F$ can also advantageously be applied to these different cases.

The process according to the invention can pertain to the search for materials that are more resistant to different forms of chemical corrosion. For the case of corrosion by oxidation, the affinity of materials for oxygen is studied. Compounds A thus are sought such that descriptors $D_{AO}$ of the bond between oxygen and compound A in a material AO are minimal. A can be, for example, a metal alloy.

It is possible to proceed analogously to seek more corrosion-resistant materials by the compounds of sulfur (sorting according to the value of descriptor $D_{AS}$) or halogens X (X=Cl, F, Br or I) (sorting according to the value of descriptor $D_{AX}$).

It is also possible to seek metal alloys A that are less able to be embrittled by hydrogen by sorting them according to the criterion of minimal value of descriptor $D_{AH}$ in hydride AH. Conversely, the search for elements P that promote superficial hardening and resistance to wear by friction of materials A can be efficiently guided by a criterion of maximum value of descriptor $D_{AP}$ in materials AP.

The search for elements C or multi-element compounds D, adhesion promoters between materials A and B, can be guided by a sorting according to the criteria of joint maximum values of descriptors $D_{AC}$ and $D_{BC}$ or else $D_{DA}$ and $D_{DB}$. Likewise, the search for elements or compounds that promote wetting of a solid A by a liquid B will be guided by a selection that leads to higher values of corresponding descriptors $D_{AB}$. Such procedures can be transferred to the search for elements or compounds that promote de-wetting or incompatibility, by sorting according to the criterion of joint minimal values of the pertinent descriptors.

This invention can also pertain to the search for materials that have special optical, electronic or magnetic properties, properties of which it is known that they are determined by the local chemical composition.

Thus, M. Jansen and H. P. Letschert (Nature, V404, pp. 980–982, Apr. 27, 2000) found new inorganic pigments in the range of red to yellow, free of chemical elements that are toxic to the environment such as cadmium and selenium. For this purpose, these authors applied a concept for the preparation of semi-conductive materials whose electronic structure has a forbidden band of selected width, a concept that is well known to one skilled in the art (J. A. van Vetchen et al., Revue de Physique (Phys. Rev. B) 2, pp. 2160–2167, 1970).

According to this concept, the forbidden band width of the semi-conductive crystalline solids is determined by the degree of coverage of the valence orbitals, on the one hand, and the difference of electronegativity between cations and anions that are present in the solid, on the other hand. It is also well known, however, that these quantities are directly tied to the energy of the chemical bonds between cations and anions.

The ionic conductivity of the oxides used as solid electrolytes in the fuel cells is essentially determined by the mobility of the oxygen anions in the crystalline lattice. This mobility is directly tied to the energy of the chemical bonds between these anions and the matrix, such that they can be quantified by the descriptors according to the invention. This invention can therefore pertain to the search for new families of oxides with very high conductivity, for example by considering systematic cationic substitutions in the oxides of fluorite structure that have oxygen gaps, as suggested in "Conception de conducteurs ioniques oxydes (Oxide-Ion Conductors by Design)" Nature, Vol. 404, Apr. 20, 2000, pp. 821–822, by Pr. J. B. Goodenough.

In research according to this principle, if the hypothetical structures that are considered are shown by generic formula AO, the calculation according to the invention of difference $AD_{AO}$ between descriptors $D_{AO}$ for O in normal crystallographic position and $D'_{AO}$ for O in intermediate position that maximizes $D'_{AO}$ between a normal position and an adjacent gap will provide a measurement correlated to the mobility in an electric field of element O in its crystalline matrix, desired property of use. The most advantageous structures will correspond to minimal values of $AD_{AO}$.

Other applications of the invention to the search for materials for optical, electronic or magnetic properties are possible, and the indicated list is not limiting.

In summary, the invention therefore relates to a process for estimating a property of use of a material $M_{AB}$ whose active element is AB that comprises the following stages:

a) Determination of the value of descriptors $D_{XY}$ for a set of materials $M_{XY}$ whose active element is XY and whose index $R_{XY}$ that measures the property of use of said material is known, b) diagram or mathematical expression of correlation $R_{XY}=f(D_{XY})$, c) calculation of descriptor $D_{AB}$ for material $M_{AB}$, d) determination of index $R_{AB}$ that constitutes an estimation of the property of use for material $M_{AB}$ by relating value $D_{AB}$ to correlation $R_{XY}=f(D_{XY})$, or by using the mathematical expression of said correlation.

In the process according to the invention, when the crystalline characteristics of the materials are available, descriptors $D_{XY}$ and/or $D_{AB}$ can optionally be calculated with process P1 that comprises the following stages:

a1) Identification of the crystalline characteristics of material XY (or AB) in an experimental crystallographic data base, a2) calculation of total energy $E_{XY}$ (or $E_{AB}$) per unit mesh of the Bravais lattice of XY (or AB), a3) construction of sub-mesh X (or A) that is obtained by eliminating the B-type atoms of optimal mesh XY (or AB), a4) calculation of total energy $E_X$ (or $E_A$) per unit mesh of the Bravais lattice of X (or A), a5) construction of sub-mesh Y (or B) that is obtained by eliminating all of the atoms that belong to complement X (or A) in optimal mesh XY (or AB), a6) calculation of total energy $E_Y$ (or $E_B$) per unit mesh Y (or B) of the Bravais lattice of B, a7) determination of number n of atoms of X (or A) that are present in the first sphere of coordination of a Y (or B) atom in optimal mesh XY (or AB), a8) determination of number b of Y (or B) atoms per optimal mesh XY (or AB), a9) calculation of descriptor $D_{XY}$ (or $D_{AB}$) by applying the following formula: $D_{XY}=[E_{XY}-(E_X+E_Y)]/nb$ (or $D_{AB}=[E_{AB}-(E_A+E_B)]/nb$).

In the process according to the invention, descriptors $D_{XY}$ and $D_{AB}$ can also optionally be calculated with process P2 that comprises the following stages:

a1) Identification of the crystalline characteristics of material XY (or AB) by analogy with existing structures, a2) calculation of total energy $E_{XY}$ (or $E_{AB}$) per unit mesh of the Bravais lattice of XY (or AB), a3) iterative search for the values of the mesh parameters of the structure that minimize the total energy according to the adopted calculation method and that define optimal mesh XY (or AB) of total energy $E_{XY}$ (or $E_{AB}$), a4) construction of sub-mesh X (or A) that is obtained by eliminating the B-type atoms of optimal mesh XY (or AB), a5) calculation of total energy $E_X$ (or $E_A$) per unit mesh of the Bravais lattice of A, a6) construction of sub-mesh Y (or B) that is obtained by eliminating all of the atoms that belong to complement X (or A) in optimal mesh XY (or AB), a7) calculation of total energy $E_Y$ (or $E_B$) per unit mesh Y (or B) of the Bravais lattice of Y (or B), a8) determination of number n of X (or A) atoms that are present in the first sphere of coordination of a Y (or B) atom in optimal mesh XY (or AB), a9) determination of number b of Y (or B) atoms per optimal mesh XY (or AB), a10) calculation of descriptor $D_{XY}$ (or $D_{AB}$) by applying the following formula: $D_{XY}=[E_{XY}=(E_X+E_Y)]/nb$ (or $D_{AB}=[E_{AB}=(E_A+E_B)]/nb$.

It is also possible to use the process according to the invention by calculating certain descriptors with process P1 and others with process P2.

The invention also relates to a process for determining the chemical affinity of an element or set of elements B for a matrix A, comprising the following stages:

a) Identification of the crystalline characteristics of material AB and calculation of the total energy per unit mesh of AB or iterative search for the values of the parameters of optimal mesh AB of total energy $E_{AB}$, b) construction of sub-mesh A by eliminating the B-type atoms of the optimal mesh, c) calculation of total energy $E_A$ per unit mesh of A, d) construction of sub-mesh B eliminating all of the atoms that belong to complement A in the optimal mesh, e) calculation of total energy $E_B$ per unit mesh of B, f) determination of number n of A atoms that are present in the first sphere of coordination of an atom B in the optimal mesh, g) determination of number b of B atoms in the optimal mesh, h) calculation of descriptor $D_{AB}$ according to formula $D_{AB}=2[E_{AB}-(E_A+E_B)]/nb$.

When the crystallographic data that relate to material AB are available, stage a) comprises the identification of the crystalline characteristics of material AB and the calculation of the total energy per unit mesh of AB. When these crystallographic data are not available, stage a) comprises the iterative search for the values of parameters of optimal mesh AB of total energy $E_{AB}$. It is possible, however, and even sometimes preferred, to carry out said iterative search even when the corresponding crystallographic data are available.

In the processes according to the invention, material AB can be, for example, a catalyst, and the property of use can be, for example, the catalytic activity of said catalyst in a chemical reaction or its resistance to poisoning by impurities. The property of use can also optionally be the ability to hold a radio-element in a solid mineral matrix.

Many other properties of use can be considered. In the processes according to the invention, the property of use thus can be selected from, for example, the group that consists of: the resistance of the material to corrosion, the embrittlement of the material by hydrogen, adhesion to another material, resistance of the material to a mechanical effect that affects its integrity such as deformation, rupture or wear, wettability or non-wettability by a liquid. It can also be selected from the group that consists of: optical properties, magnetic properties or electronic properties.

The invention therefore generally relates to the use of one of the processes according to the invention for the design of new materials whose use produces the formation or the modification of at least one chemical bond or makes it necessary to prevent the formation of said bond. This new material then most generally has an improved property of use.

EXAMPLES

Application to the search for new compositions of catalytic materials: this first series of examples illustrates the advantage of the process according to the invention for identifying compositions of catalytic materials (catalysts) whose active component is an alloy of two transition metals, when the relative activities of the catalysts, of which the active component is each of the pure transition metals, are known. The catalytic reactions that are studied are hydrogenation of ethylene, hydrogenation of benzene, and the hydrogenation reaction of carbon monoxide into methane.

Example 1

Calculation of the Descriptors

In the case of metal carbides, the process according to the invention makes it possible to calculate descriptors $D_{MC}$ of the metal-carbon bond for the set of transition elements from crystalline characteristics of the corresponding carbides. These characteristics were mainly noted in the data base "Crystmet," in the version distributed by the company Materials Design S.A.R.L. under the MedeA interface, version 1.1.1.4. For the carbides whose characteristics were absent from the Crystmet base, the procedure was performed analogously by adopting the perovskite structure $M_4C$, of $BaTiO_3$ type, which corresponds to the compound for inserting carbon into the center of the cube in the face-centered cubic lattice of the metal and by searching on a case-by-case basis for the optimal cubic mesh, i.e., edge value a of the cubic lattice that corresponds to the minimum of the total electronic energy.

The calculation of the total electronic energy was carried out by implementing the ElectrA program, distributed by the company Materials Design S.A.R.L. under the MedeA interface, version 1.1.1.4. The results obtained are presented in Table 1.

TABLE 1

Calculation of descriptors $D_{MC}$ relative to different transition metals.

| Metal | Carbure | Ref. Carbure | nxb | $E_{MC} \times 2$ (kJ.mol$^{-1}$) | $E_M \times 2$ (kJ.mol$^{-1}$) | $E_C \times 2$ (kJ.mol$^{-1}$) | $D_{MC} \times 2$ (kJ.mol$^{-1}$) |
|---|---|---|---|---|---|---|---|
| Ir | Ir$_4$C | Opt (a = 0.408 nm) | 6 × 1 | −374344416 | −374147297 | −196731 | 64.6 |
| Os | Os$_4$C | Opt (a = 0.400 nm) | 6 × 1 | −362303712 | −362106520 | −196715 | 79.4 |
| Pt | Pt$_4$C | Opt (a = 0.416 nm) | 6 × 1 | −386641954 | −386444654 | −196719 | 96.8 |
| Re | ReC | 27291 | 6 × 1 | −87777536 | −87579546 | −197304 | 114.3 |
| Pd | Pd$_4$C | Opt (a = 0.411 nm) | 6 × 1 | −106056569 | −105859011 | −196721 | 139.5 |
| Rh | Rh$_4$C | Opt (a = 0.412 nm) | 6 × 1 | −100565402 | −100367684 | −196725 | 165.5 |
| Ru | Ru$_4$C | Opt (a = 0.410 nm) | 6 × 1 | −95249682 | −95051829 | −196727 | 187.6 |
| Ni | Ni$_3$C | 86574 | 6 × 2 | −48220390 | −47823840 | −393805 | 228.7 |
| Cr | CrC | 62507 | 6 × 1 | −5704630 | −5505845 | −197300 | 247.5 |
| Cu | Cu$_4$C | Opt (a = 0.405 nm) | 6 × 1 | −34896080 | −34697720 | −196735 | 270.8 |
| Fe | Fe$_2$C | 81656 | 6 × 2 | −27076100 | −26678772 | −394046 | 273.5 |
| W | WC | 34902 | 6 × 1 | −84893258 | −84694296 | −197174 | 297.9 |
| Co | Co$_2$C | 27080 | 6 × 2 | −29607825 | −29210080 | −394058 | 307.2 |
| Ta | Ta$_4$C$_3$ | 84332 | 6 × 3 | −328082780 | −327485482 | −591115 | 343.5 |

[Key to table: Métal = metal; Carbure = carbide]

In Table 1, the references (column ref.) indicate either the number in the Crystmet base or optimal mesh parameter "a" that results from the optimization (when the mesh is the optimal mesh according to the method of calculation implemented in the ElectrA program, case pointed out by the abbreviation Opt.).

Example 2

Hydrogenation from Ethylene

Indices $R_{MC}$ that are used in this example are the relative inherent catalytic activities $A_r^{hydC2H4}$ as regards the hydrogenation of ethylene of a series that represents transition elements. These activities have been measured by various authors at 273K and 0.1 MPa, on metallic films (O. Beeck, Modern Phys., 17, 61, 1945 and Disc. Faraday Soc., 8, 118, 1950) or in the state with a silica substrate (G. C. A. Schuit et al., Adv. Catalysis 10, 242, 1958). The two authors essentially found the same results for the two implementations of the active metal.

Table 2 presents these available experimental results and combines them with values of descriptors $D_{MC}$, calculated with the process according to the invention and extracted from Table 1. The activities are related to the per-atom activity of rhodium, the most active metal that is known for this reaction, such that $A_r^{hydC2H4}(Rh)=1$.

TABLE 2

Relative activities of the transition metals for the reaction for hydrogenation of ethylene and corresponding values of descriptors $D_{MC}$. (The transition metals are classified by increasing values of $D_{MC}$.)

| Métal M | $A_r^{hydC2H4}$ | $D_{MC} \times 2$ (kJ.mol$^{-1}$) |
|---|---|---|
| Ir | 0.135 | 64.6 |
| Pt | 0.207 | 96.8 |
| Pd | 0.43 | 139.5 |
| Rh | 1.0 | 165.5 |
| Ru | 0.74 | 187.6 |
| Ni | 0.12 | 228.7 |
| Cr | 0.015 | 247.5 |
| Cu | 0.017 | 270.8 |

TABLE 2-continued

Relative activities of the transition metals for the reaction for hydrogenation of ethylene and corresponding values of descriptors $D_{MC}$. (The transition metals are classified by increasing values of $D_{MC}$.)

| Métal M | $A_r^{hydC2H4}$ | $D_{MC} \times 2$ (kJ.mol$^{-1}$) |
|---|---|---|
| Fe | 0.041 | 273.5 |
| W | 0.018 | 297.9 |
| Ta | 0.0123 | 343.5 |

FIG. 1 is a graphic representation of the results of Table 2 in which $D_{MC}$ is plotted on the abscissa and $A_r^{hydC2H4}$ is plotted on the ordinate. Each point of coordinates ($D_{MC}$, $A_r^{hydC2H4}$ (M)) characterizes the inherent catalytic behavior of a metal M for the reaction that is considered independently of its implementation. By connecting all of these dots, it is noted that, surprisingly enough, a master "volcano" curve is obtained.

Example 3

Hydrogenation of Benzene

Indices $R_{MC}$ that are used in this example are relative inherent catalytic activities $A_r^{hydC6H6}$ as regards the hydrogenation of benzene. These activities have been measured at 373 K and 0.1 MPa by different authors for a series that is representative of the transition elements (see, for example, French Patent FR 2 072 586, and the book "Catalyse de Contact [Contact Catalysis]," edition updated in English ("Applied Heterogeneous Catalysis") by J. F. LePage et al., p. 294, Technip, Paris, 1987).

Table 3 presents these available experimental results and combines them with the values of descriptors $D_{MC}$, calculated with the process according to the invention and extracted from Table 1. The activities are related to the per-atom activity of platinum, the most active metal that is known for this reaction, such that $A_r^{hydC6H6}$ (Pt)=1.

TABLE 3

Activities relative to the transition metals for the hydrogenation reaction of benzene and values of corresponding descriptors $D_{MC}$ (the transition metals are classified by increasing values of $D_{MC}$).

| Métal M | $A_r^{hydC6H6}$ | $D_{MC} \times 2$ (kJ.mol$^{-1}$) |
|---|---|---|
| Ir | 0.0067 | 64.6 |
| Os | 0.075 | 79.4 |
| Pt | 1 | 96.8 |
| Re | 0.059 | 114.3 |
| Pd | 0.055 | 139.5 |

Figure 2:
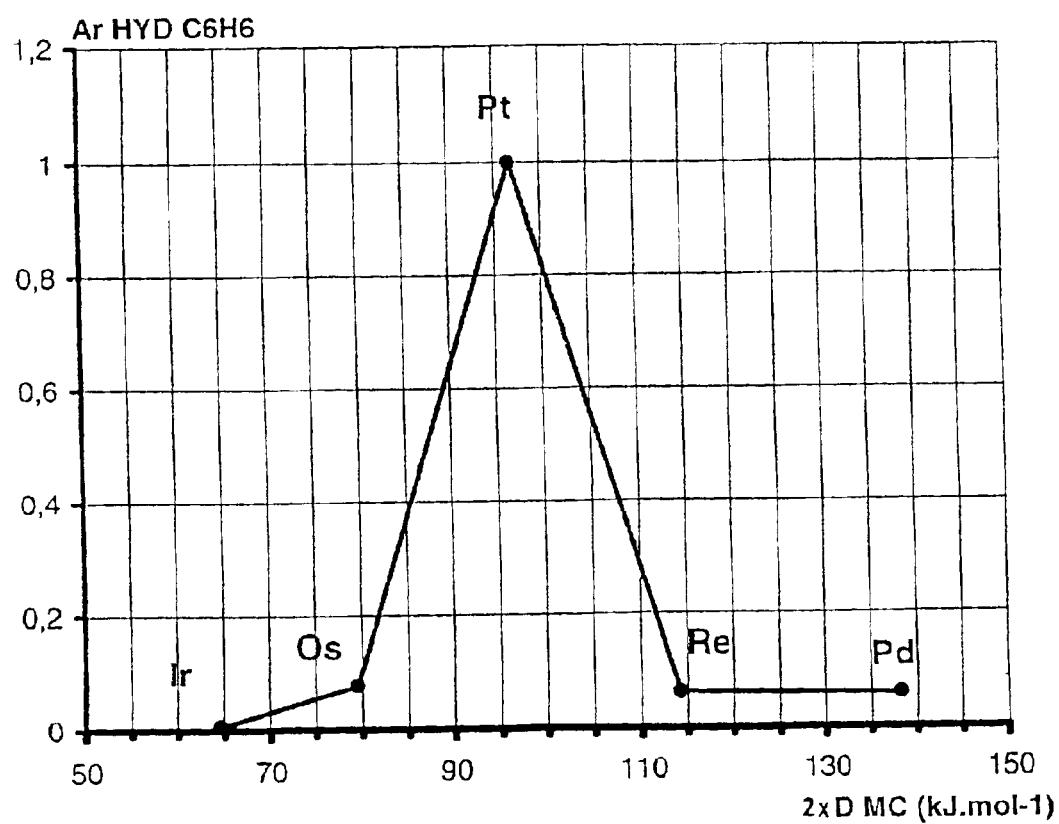

In FIG. 2, $D_{MC}$ is plotted on the abscissa and $A_r^{hydC6H6}$ is plotted on the ordinate, so as to depict graphically the results of Table 3, each point of coordinates ($D_{MC}$, $A_r^{hydC6H6}$ (M)) represents the inherent catalytic behavior of a metal M for the reaction that is considered independently of its implementation. By connecting all of these dots, it is noted again that a master "volcano" curve is obtained.

Example 4

Hydrogenation of Carbon Monoxide

Indices $R_{MC}$ that are used in this example are relative inherent catalytic activities $A_r^{hydCO}$ as regards the hydrogenation reaction of carbon monoxide into methane. These activities were measured at 548 K and 0.1 MPa with a molar ratio of $H_2/CO=3$ by different authors for a series that is representative of the transition elements. The values that are adopted are derived from the critical analysis that is published by M. A. Vannice (Catal Rev. Sci. Eng. 14, 2, pp. 153–191, 1976).

Table 4 presents these experimental results and combines them with values of descriptors $D_{MC}$, calculated according to the invention and extracted from Table 1. The activities are related to the per-atom activity of ruthenium, the most active metal that is known for this reaction, such that $A_r^{hydCo}$ (Ru)=1.

TABLE 4

Relative activities to the transition metals for the reaction of methanation of carbon monoxide and values of the corresponding descriptors $D_{MC}$ (the transition metals are classified by increasing values of $D_{MC}$).

| Métal M | $A_r^{hydCO}$ | $D_{MC} \times 2$ (kJ.mol$^{-1}$) |
|---|---|---|
| Ir | 0.127 | 64.6 |
| Pt | 0.156 | 96.8 |
| Pd | 0.304 | 139.5 |
| Rh | 0.313 | 165.5 |
| Ru | 1.000 | 187.6 |
| Ni | 0.600 | 228.7 |
| Fe | 0.589 | 273.5 |
| Co | 0.387 | 307.2 |

Figure 3:
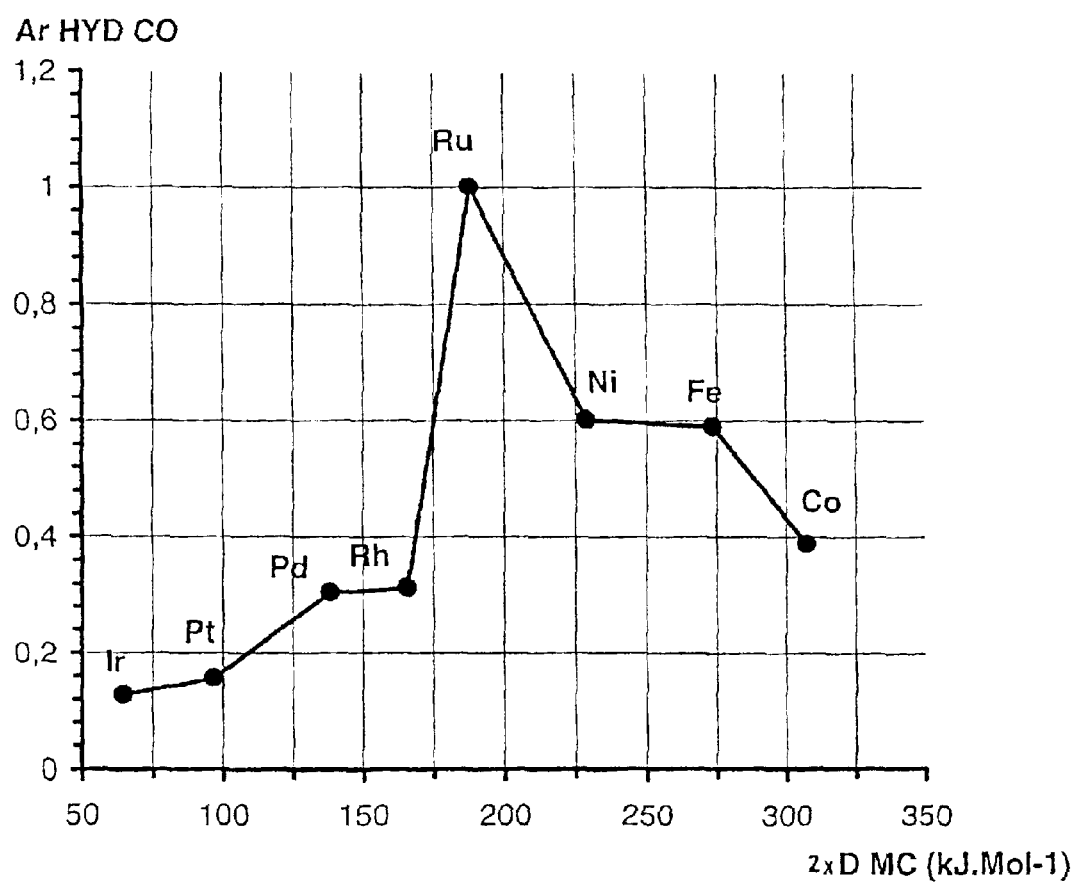

FIG. 3 is a graphic representation of the results of Table 4 with $D_{MC}$ plotted on the abscissa and $A_r^{hydCO}$ plotted on the ordinate. Each point of coordinates ($D_{MC}$, $A_r^{hydCO}$(M)) represents the inherent catalytic behavior of a metal M for the reaction that is considered independently of its implementation. By connecting all of these dots, it is noted again that a master "volcano" curve is obtained.

Example 5

Comparison Between the Activities that are Predicted and Measured Experimentally The performance levels (activities) of a series of alloys of two transition metals, relative to the reactions considered, have been determined experimentally. Furthermore, descriptors $D_{MC}$ of each alloy were determined by taking into account, of course, the composition and the crystalline structure adopted for the alloy. Table 5 presents the selected bimetallic pairs, as well as the intermediate results that are necessary for the calculation of descriptors $D_{MC}$.

TABLE 5

Metal pairs adopted.

| Couple | Carbure | Ref. Carbure | nxb | $E_{MC} \times 2$ (kJ.mol$^{-1}$) | $E_M \times 2$ (kJ.mol$^{-1}$) | $E_C \times 2$ (kJ.mol$^{-1}$) | $D_{MC} \times 2$ (kJ.mol$^{-1}$) |
|---|---|---|---|---|---|---|---|
| Au | Au$_4$C | Opt (a = 0.417 nm) | 6 × 1 | −399199021 | −399002251 | −196716 | 9.0 |
| Ir | Ir$_4$C | Opt (a = 0.408 nm) | 6 × 1 | −374344416 | −374147297 | −196731 | 64.6 |
| Os | Os$_4$C | Opt (a = 0.400 nm) | 6 × 1 | −362303712 | −362106520 | −196715 | 79.4 |
| IrOs | Os$_3$IrC | Opt (a = 0.404 nm)1 | 6 × 1 | −365313907 | −365116667 | −196739 | 83.4 |
| Pt | Pt$_4$C | Opt (a = 0.416 nm) | 6 × 1 | −386641954 | −386444654 | −196719 | 96.8 |
| IrRe | Re$_3$IrC | Opt (a = 0.406 nm) | 6 × 1 | −356472810 | −356275504 | −196740 | 94.4 |
| Re | ReC | 27291 | 6 × 1 | −87777536 | −87579546 | −197304 | 114.3 |
| PtAu | Pt$_3$AuC | Opt (a = 0.417 nm) | 6 × 1 | −389781487 | −389584010 | −196716 | 126.8 |
| PtPd | Pd$_3$PtC | Opt (a = 0.414 nm) | 6 × 1 | −176202917 | −176005434 | −196721 | 127.1 |
| Pd | Pd$_4$C | Opt (a = 0.411 nm) | 6 × 1 | −106056569 | −105859011 | −196721 | 139.5 |
| PdAu | Pd$_3$AuC | Opt (a = 0.415 nm) | 6 × 1 | −179342450 | −179144864 | −196719 | 144.4 |
| PdAg | Pd$_3$AgC | Opt (a = 0.412 nm) | 6 × 1 | −107473939 | −107276290 | −196696 | 158.8 |
| Ni | Ni$_3$C | 86574 | 6 × 2 | −48220390 | −47823840 | −393805 | 228.7 |
| FeCo | FeCoC | Dérivé de 81656 | 6 × 2 | −28341529 | −27944516 | −394033 | 248.2 |
| FeNi | FeNiC | Dérivé de 81656 | 6 × 2 | −29677722 | −29280498 | −394033 | 265.9 |
| Fe | Fe$_2$C | 81656 | 6 × 2 | −27076100 | −26678772 | −394046 | 273.5 |
| Co | Co$_2$C | 27080 | 6 × 2 | −29607825 | −29210080 | −394058 | 307.2 |

[Key to Table 5: Couple = pair; Carbure = carbide; Dérivé de 81656 = derivative of 18656]

(The materials are classified by increasing values of descriptor $D_{MC}$. The data relating to pure metals that are present in the pairs are indicated by small italics. The other notations are the same as explained in Table 1.)

By recording the values of $D_{MC}$ that are obtained for the alloys on the axes of the abscissas of the graphs that correspond to the master curves shown in FIGS. 1 to 3, it is possible to read in ordinates on the master curves of relative catalytic activity values that are the activity values predicted for the alloys relative to the corresponding reactions.

Table 6 presents the values of descriptors $D_{MC}$, the activities that are predicted and measured experimentally for each alloy that is considered. This table demonstrates that the invention makes it possible to obtain a satisfactory agreement between predicted activities and experimental activities, taking into account the uncertainties of experimental measurement, on the one hand, and of the approximation that is made on the nature of the active bimetallic combination, on the other hand.

TABLE 6

Comparison of predicted catalytic activities according to the invention and experimental activities for the metal pairs adopted in Example 1.

| Couple | $D_{MC} \times 2$ | Réaction | Activité Exp. | Ref. | Activité prédite |
|---|---|---|---|---|---|
| Os$_3$Ir | 83.4 | Hyd B | 12.7 (Os = 1) | (a) | 3.8 (Os = 1) |
| Re$_3$Ir | 94.4 | Hyd B | 4.6 (Re = 1) | (b) | 14.9 (Re = 1) |
| Pt$_3$Au | 126.8 | Hyd X | 0.7 (Pt = 1) | (c) | 0.33 (Pt = 1) |
| Pd$_3$Pt | 127.1 | Hyd X | 0.26 (Pt = 1) | (c) | 0.32 (Pt = 1) |
| Pd$_3$Au | 144.4 | Hyd E | 1.6 (Pd = 1) | (d) | 1.24 (Pd = 1) |
| Pd$_3$Ag | 158.8 | Hyd E | 1.3 (Pd = 1) | (e) | 1.98 (Pd = 1) |
| FeCo | 248.2 | Méth. | 1.15 (Fe = 1) | (f) | 1.19 (Fe = 1) |
| FeNi | 265.9 | Méth. | 0.7 (Fe = 1) | (f) | 1.02 (Fe = 1) |

[Key: Couple = pair; Réaction = reaction; ActivitéExp. = experimental activity; Activitéprédite = predicted activity]
(a) G. Leclerc et al., Bull. Soc. Chim. Belg., 88, 7–8, p. 577, 1979.
(b) J. P. Brunelle et al., CRAS Series C, T282, pp. 879–882, 1976.
(c) E. Guillon, Thése Université Paris VI, Chap. II, p. 112, 1999.
(d) S. H. Inami, H. Wise, J. Catal., 46, p. 204, 1977.
(e) M. Kowaka, J.Jap. Inst. Metals, 23, p. 655, 1959.
(f) J. A. Amelse et al., J. Catal. 72, p.95, 1981.

The values of $D_{MC}$ are in kJ.mol$^{-1}$. The reactions that are considered are the hydrogenation of benzene (HYD B, ref. a and b) or xylene (HYD X, ref. c), the hydrogenation of ethylene (HYD E, ref. d and e), and the hydrogenation of carbon monoxide into methane (Méth., ref. f). The experimental or predicted activities are expressed in values relative to that of a pure metal. The predicted activities are obtained by linear interpolation on the master curves of FIGS. 1 to 3.

The process according to the invention makes it possible to provide the experimentally observed effects such as:

the significant promoter effect of iridium on osmium and the rhenium by hydrogenation of benzene, the negative effect of gold and palladium on the platinum by hydrogenation of a monoaromatic compound, the promoter effects of gold and silver on palladium in hydrogenation of ethylene, the slightly promoter effect of cobalt on iron in methanation, the quasi-absence of a significant effect of nickel on iron in methanation.

The process according to the invention therefore pertains to combinations of elements in any number and proportions and makes possible the evaluation for purposes of preliminary sorting of the property of use (catalytic activity) of this combination for the catalytic reactions whose master curves (activity/$D_{MC}$) relative to the pure elements were determined in advance.

Example 6

Application to the Search for Radio-element Storage Materials

Fluoroapatite $Ca_{10}(PO_4)_6F_2$ is known as one of the materials that is most resistant to damage following irradiation, this is why structural analogs of this mineral were proposed for the storage of isotopes of radio-elements that are dangerous to the environment. There also exist natural examples of such structural analogs, the Oklo britholites, site of a fossil nuclear reactor (R. Bros et al. Radiochim. Acta 74, 277, 1996). These britholites have as a general formula $Ca_{10-y}E_y(SiO_4)_y(PO_4)_{6-y}(F,OH)_2$, where E represents a rare earth or an actinide with an oxidation degree of 3 and including a real number of between 0 and 6, and the same crystallographic structure that is derived from that of the fluoroapatite, in particular with a hexagonal unit mesh and a symmetry that is less than or equal to that of space group P63/m. The cations occupy two sites that are crystallographically non-equivalent, whereby type (1) has in its first coordination sphere 9 first oxygen neighbors O, and whereby type (2) has in its first coordination sphere 6 first neighbors O and a first neighbor F or O of a hydroxyl group OH. It is known experimentally (J. Lin et al. Materials Chemistry and Physics, 38, pp. 98–101, 1994) that the cations of higher ion radiation and low charge have a greater affinity for sites (1) while the cations of weaker ion radiation and high charge have a greater affinity for sites (2).

The process according to the invention has been applied for evaluating descriptors $D_{AB}$ in the cases that are defined in Table 7:

TABLE 7

Definition of the cases in question of Example 6 (by disclosing, between parenthesis, the location of the element concerned is indicated at site (1) or site (2)).

| Structure | Elément B | Matrice A | Cas |
|---|---|---|---|
| $Ca_4^{(1)}Ca_6^{(2)}(PO_4)_6F_2$ | Ca (site 1) | $Ca_6^{(2)}(PO_4)_6F_2$ | 1 |
| $Ca_4^{(1)}Ca_6^{(2)}(PO_4)_6F_2$ | Ca (site 2) | $Ca_4^{(1)}(PO_4)_6F_2$ | 2 |
| $Ca_{10}(PO_4)_6F_2$ | Ca (site quelconque) | $(PO_4)_6F_2$ | 2 bis |
| $Sr_4^{(1)}Sr_6^{(2)}(PO_4)_6F_2$ | Sr (site 1) | $Sr_6^{(2)}(PO_4)_6F_2$ | 3 |
| $Sr_4^{(1)}Sr_6^{(2)}(PO_4)_6F_2$ | Sr (site 2) | $Sr_4^{(1)}(PO_4)_6F_2$ | 4 |
| $Sr_{10}(PO_4)_6F_2$ | Sr (site quelconque) | $(PO_4)_6F_2$ | 4 bis |
| $Ca_{10}(PO_4)_6I_2$ | I | $Ca_{10}(PO_4)_6$ | 5 |
| $Ca_{10}(PO_4)_6F_2$ | F | $Ca_{10}(PO_4)_6$ | 6 |
| $Ca_4^{(1)}Ca_5^{(2)}U^{(2)}(SiO_4)(PO_4)_5F_2$ | U (site 2) | $Ca_4^{(1)}Ca_5^{(2)}(SiO_4)(PO_4)_5F_2$ | 7 |
| $Ca_4^{(1)}Ca_5^{(2)}U^{(2)}(SiO_4)(PO_4)_5F_2$ | Ca (site 2) | $Ca_4^{(1)}U^{(2)}(SiO_4)(PO_4)_5F_2$ | 8 |
| $Ca_3^{(1)}Cs^{(1)}Ca_5^{(2)}U^{(2)}(PO_4)_6F_2$ | Cs (site 1) | $Ca_3^{(1)}Ca_5^{(2)}U^{(2)}(PO_4)_6F_2$ | 9 |
| $Ca_3^{(1)}Cs^{(1)}Ca_5^{(2)}U^{(2)}(PO_4)_6F_2$ | Ca (site 1) | $Cs^{(1)}Ca_5^{(2)}U^{(2)}(PO_4)_6F_2$ | 10 |
| $Ca_3^{(1)}Cs^{(1)}Ca_5^{(2)}U^{(2)}(PO_4)_6F_2$ | U (site 2) | $Ca_3^{(1)}Cs^{(1)}Ca_5^{(2)}(PO_4)_6F_2$ | 11 |
| $Ca_3^{(1)}Cs^{(1)}Ca_5^{(2)}U^{(2)}(PO_4)_6F_2$ | Ca (site 2) | $Ca_3^{(1)}Cs^{(1)}U^{(2)}(PO_4)_6F_2$ | 12 |

[Key: Elé B = element B; Matrice A = matrix A; Cas = case; site quelconque = any site]

In the example below, the calculated descriptors are noted, for example, $D_{mU6}$ for descriptor of the energy of a U-matrix bond in case 6.

The crystallographic characteristics of the fluoroapatite and britholite structures have been found in the ICSD data base (reference 9444 of the ICSD base). The determination ab initio of the total energy per mesh of different complete or partial structures that occur in the calculation of the various descriptors was obtained by using the "CASTEP" software, distributed by the company Molecular Simulations, Inc., 6985 Scranton Road, Calif. 92121-3752, USA. The complete meshes were not optimized, while the initial mesh of the fluoroapatite had been preserved. The various quantities that are present in the calculation of the descriptors according to the invention and obtained for this example are summarized in Table 8.

The comparison of $D_{mCs9}$ and $D_{mCa10}$, on the one hand, and $D_{mU11}$ and $D_{mCa12}$, on the other hand, make it possible to evaluate the ratio of solubilities of Cs and Ca on sites (1) in the fluoroapatite, on the one hand, and of U and Ca on sites (2), on the other hand, and thereby the potential of the fluoroapatite for the simultaneous storage of radioactive isotopes of cesium and uranium by substitution with calcium.

TABLE 8

Calculation of the descriptors according to the invention
(the numbering of these cases is indicated in Table 7).

| Cas | Descr. | nxb | E[AB] (kJ.mol−1) | E[AB-B] × 2 (kJ.mol−1) | E[AB-A] × 2 (kJ.mol−1) | D[AB] × 2 (kJ.mol1) |
|---|---|---|---|---|---|---|
| 1 | $D_{mCa1}$ | 9 × 4 | −2224947.555 | −1832982.568 | −386969.842 | 138.7 |
| 2 | $D_{mCa2}$ | 7 × 6 | −2224947.555 | −1636683.288 | −580826.534 | 177.1 |
| 2bis | $D_{mCa2bis}$ | 7,8 × 10 | −2224947.555 | −1244786.335 | −968522.4154 | 149.2 |
| 3 | $D_{mSr3}$ | 9 × 4 | −2066270.622 | −1737771.771 | −323791.119 | 130.8 |
| 4 | $D_{mSr4}$ | 7 × 6 | −2066270.622 | −1573285.003 | −486176.910 | 162.1 |
| 4bis | $D_{mSr4bis}$ | 7,8 × 10 | −2066270.622 | −1244786.335 | −810478.644 | 141.1 |
| 5 | $D_{mI5}$ | 3 × 2 | −2155822.089 | −2052644.693 | −96484.504 | 1115.5 |
| 6 | $D_{mF6}$ | 3 × 2 | −2224947.555 | −2096062.721 | −127306.756 | 263.0 |
| 7 | $D_{mU7}$ | 7 × 1 | −2256817.771 | −2119698.721 | −135204.7331 | 273.5 |
| 8 | $D_{mCa8}$ | 7 × 5 | −2256817.771 | −1767347.797 | −483937.02 | 31.6 |
| 9 | $D_{mCs9}$ | 9 × 1 | −2219511.52 | −2166370.398 | −53339.046 | 22.0 |
| 10 | $D_{mCa10}$ | 9 × 3 | −2219505.785 | −1926116.524 | −290174.559 | 39.7 |
| 11 | $D_{mU11}$ | 7 × 1 | −2219505.785 | −2082594.463 | −135204.733 | 243.8 |
| 12 | $D_{mCa12}$ | 7 × 5 | −2219505.785 | −1730197.794 | −483937.02 | 30.7 |

[Key: Cas = case]

Solubility ratios are presented in Table 9. They are evaluated from descriptors whose values are presented in Table 8, according to the general formula that is derived from the Boltzmann law:

$$RS[Ai/Bj] = \mathrm{Exp}\,((D_{mAi} - D_{mBj})/kT)$$

brought to the reference temperature of 1700K, temperature at which the synthesis of britholites from mineral sources of the components is efficient (L. Boyer, thèse INP Toulouse, July 1998). In this general formula, k is the Boltzmann constant and is equivalent to 0.00831156 kJ.mol−1.K−1, and T is the absolute temperature in Kelvin.

The comparison of $D_{mCa1}$ and $D_{mSr3}$ makes it possible to evaluate the ratio of solubilities of Ca and Sr on site (1) in the fluoroapatite, on the one hand, the comparison of $D_{Ca2}$ and $D_{Sr4}$ makes it possible to evaluate the ratio of solubilities of Ca and Sr on site (2) in the fluoroapatite, on the other hand, and thereby the potential of the fluoroapatite for the storage of radioactive isotopes of strontium by substitution with calcium. A complementary comparison produces $D_{mCa2bis}$ and $D_{mSr4bis}$: it makes it possible to evaluate the overall ratio of the solubilities of Ca and Sr on any site in the fluoroapatite.

The comparison of $D_{mI5}$ and $D_{mF6}$ makes it possible to evaluate the ratio of the solubilities of I and F in the fluoroapatite and thereby the potential of the fluoroapatite for the storage of radioactive isotopes of the iodine by substitution with fluorine.

The comparison of $D_{mO7}$ and $D_{mCa8}$ makes it possible to evaluate the ratio of the solubilities of U and Ca on site (2) in britholite and thereby the potential of britholite for the storage of radioactive isotopes of uranium by substitution with calcium on sites (2).

TABLE 9

Calculation of the solubility ratios at 1700K from descriptors according to the invention (the numbering associated with the chemical elements is indicated in the cases described in Table 7)

| Ai/Bj | RS[Ai/Bj] | Minéral de stockage | Elément à stocker |
|---|---|---|---|
| Sr4bis/Ca2bis | 0.56 | Fluoroapatite | Sr |
| Sr3/Ca1 | 0.57 | Fluoroapatite | Sr |
| Sr4/Ca2 | 0.348 | Fluoroapatite | Sr |
| I5/F6 | $1.7, 10^{26}$ | Fluoroapatite | I |
| U7/Ca8 | $2.8, 10^7$ | Britholite | U |
| Cs9/Ca10 | 0.013 | Fluoroapatite | Cs |
| U11/Ca12 | $0.32, 10^7$ | Fluoroapatite | U |

[Key: Minéral de stockage = storage material; Elément à stocker = element to be stored]

Table 9 shows that the process according to the invention makes it possible to sort according to a quantitative criterion the different crystalline materials that are considered based on their capability to solubilize the radioactive isotopes of the elements strontium, cesium and uranium, on the one hand, and iodine, on the other hand, by ionic substitution with calcium elements, on the one hand, and fluorine, on the other hand. It is noted in particular that the invention makes it possible to provide a very high affinity of the fluoroapatite for the iodine and its radioactive isotopes by substitution with fluorine.

The fluoroapatite also makes it possible to substitute partially the strontium and its radioactive isotopes with calcium, whereby the strontium, however, remains less soluble than the calcium in the fluoroapatite. The Sr3/Ca1 ratio that is obtained is higher than the Sr4/Ca2 ratio. The process according to the invention therefore makes it possible to provide, according to the above-mentioned experiment of LIN et al. that crystallographic site (1) is preferred to site (2), whereby the strontium with oxidation degree +2 has a higher ion radiation (0.126 nm) than the one of calcium (0.100 nm) for the same oxidation degree +2.

The process according to the invention makes it possible to provide a higher solubility of the uranium on site (2) of britholite, which confirms the existence of uranium-rich britholites of the fossil nuclear reactor of the Oklo site in the Congo. By contrast, the simultaneous substitution of a $Ca^{+2}$ ion by a $Cs^{+1}$ ion on site (1) and a $Ca^{+2}$ ion by a $U^{+3}$ ion on site (2) of the fluoroapatite is, according to the process of the invention, an adverse process because of the negative value of descriptor $D_{mCs9}$ (Table 8). The invention therefore makes it possible to eliminate a priori the fluoroapatite as such for the storage of actinides and makes it possible to understand why one skilled in the art prefers britholites.

What is claimed is:

1. A process for the design or the selection of a material $M_{AB}$ having an active element AB, from a group of potential materials $M_{XY}$, comprising estimation of a property of use of said potential materials $M_{XY}$ by:
    a) determine a value of descriptors $D_{XY}$ for materials $M_{XY}$ whose active element is XY and whose index $R_{XY}$ that measures the property of use of said material is known,
    b) determine a correlation between descriptors $D_{XY}$ and index $R_{XY}$, wherein $R_{XY}=f(D_{XY})$,
    c) determine a desired value of descriptor $D_{AB}$ for material $M_{AB}$,
    d) estimate a property of use for material $M_{AB}$ via the determination of index $R_{AB}$ by correlation of $R_{XY}=f(D_{XY})$ between the descriptors and the indices for the materials $M_{XY}$, and select from the potential materials $M_{XY}$ a material $M_{AB}$ having the value $D_{XY}$ closest to the desired value of $D_{AB}$,
    and in which descriptors $D_{XY}$ are determined with a process that comprises the following steps:
    1) identify the crystalline characteristics of material XY,
    2) calculate the total Bravais lattice energy per unit mesh of XY, or iteratively search for values of the mesh parameters that minimize the total energy of the structure and define an optimal mesh XY of total energy $E_{XY}$,
    3) construct sub-mesh X by eliminating Y-type atoms of mesh XY,
    4) calculate a total Bravais lattice energy $E_X$ per unit mesh X,
    5) construct sub-mesh Y by eliminating all of the atoms that belong to complement X in mesh XY,
    6) calculate a total Bravais lattice energy $E_Y$ per unit mesh Y,
    7) determine a number n of X atoms that are present in the first sphere of coordination of a Y atom in mesh XY,
    8) determine a number b of Y atoms per mesh XY, and
    9) calculate the descriptor $D_{XY}=[E_{XY}-(E_X+E_Y)]/nb$.

2. A process according to claim 1, in which material $M_{AB}$ is a catalyst and the property of use is the catalytic activity of said catalyst in a chemical reaction or its resistance to poisoning by impurities.

3. A process according to claim 1, in which the property of use is the ability to hold a radio-element in a solid mineral matrix.

4. A process according to claim 1, in which the property of use is selected from the group that consists of: the resistance of the material to corrosion, the embrittlement of the material by hydrogen, the adhesion to another material, and the resistance of the material to a mechanical effect that affects its integrity selected from the group consisting of deformation, rupture, wear, and wettability or non-wettability by a liquid.

5. A process according to claim 1, in which the property of use is selected from the group that consists of: optical properties, magnetic properties and electronic properties.

6. A process for inducting the process according to claim 1, for the selection or the design of a new material whose use produces the formation or the modification of at least one chemical bond or makes it necessary to prevent the formation of said bond.

7. A process for the design or the selection of a new material via the determination of the chemical affinity of an element or set of elements B for a matrix A that comprises, for a group of potential materials,
    a) identify the crystalline characteristics of material XY, calculate the total Bravais lattice energy per unit mesh of AB, or iteratively search for values of the mesh parameters of an optimal mesh AB of total energy $E_{AB}$,
    b) construct sub-mesh A by eliminating B-type atoms of mesh AB,
    c) calculate a total Bravais lattice energy $E_A$ per unit mesh A,
    d) construct sub-mesh B by eliminating all of the atoms that belong to complement A in mesh AB,
    e) calculate a total Bravais lattice energy $E_B$ per unit mesh B,
    f) determine a number n of A atoms that are present in the first sphere of coordination of a B atom in mesh AB,
    g) determine a number b of B atoms in mesh AB, and
    h) calculate the descriptor $D_{AB}=[E_{AB}-(E_A+E_B)]/nb$.

8. A process according to claim 7, in which material AB is a catalyst and the chemical affinity relates to the catalytic activity of said catalyst in a chemical reaction or its resistance to poisoning by impurities.

9. A process according to claim 7, in which the chemical affinity relates to the ability to hold a radio-element in a solid mineral matrix.

10. A process according to claim 7, in which the chemical affinity relates to a property of use is selected from the group that consists of: the resistance of the material to corrosion, the embrittlement of the material by hydrogen, the adhesion to another material, and the resistance of the material to a mechanical effect that affects its integrity selected from the group consisting of deformation, rupture, wear, and wettability or non-wettability by a liquid.

11. A process according to claim 7, in which the chemical affinity relates to a property of use selected from the group that consists of: optical properties, magnetic properties and electronic properties.

12. A process for inducting the process according to claim 7, for the selection or the design of a new material whose affinity relates to the formation or the modification of at least one chemical bond or makes it necessary to prevent the formation of said bond.

* * * * *